United States Patent
Clüsserath

(10) Patent No.: US 9,695,029 B2
(45) Date of Patent: *Jul. 4, 2017

(54) CONTAINER-PROCESSING MACHINE FOR PROCESSING CONTAINERS

(71) Applicant: KHS GmbH, Dortmund (DE)

(72) Inventor: Ludwig Clüsserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/112,241

(22) PCT Filed: Jan. 16, 2015

(86) PCT No.: PCT/EP2015/050744
§ 371 (c)(1),
(2) Date: Jul. 18, 2016

(87) PCT Pub. No.: WO2015/107137
PCT Pub. Date: Jul. 23, 2015

(65) Prior Publication Data
US 2016/0332859 A1    Nov. 17, 2016

(30) Foreign Application Priority Data
Jan. 17, 2014    (DE) .................. 10 2014 100 496

(51) Int. Cl.
| | | |
|---|---|---|
| *B65G 37/00* | (2006.01) | |
| *B65G 47/84* | (2006.01) | |
| *B65C 3/24* | (2006.01) | |
| *B67C 7/00* | (2006.01) | |
| *B65G 29/00* | (2006.01) | |
| *B67C 3/24* | (2006.01) | |
| *B67C 3/30* | (2006.01) | |

(52) U.S. Cl.
CPC ............ *B67C 7/0046* (2013.01); *B65G 29/00* (2013.01); *B65G 37/00* (2013.01); *B65G 47/846* (2013.01); *B67C 3/242* (2013.01); *B67C 3/244* (2013.01); *B67C 3/30* (2013.01); *B67C 7/0013* (2013.01); *B65G 2201/0235* (2013.01)

(58) Field of Classification Search
CPC ....... B67C 3/242; B67C 3/244; B67C 7/0013; B67C 7/0046; B65G 29/00; B65G 37/00; B65G 47/846; B65G 2201/0235
See application file for complete search history.

(56) References Cited

U.S. PATENT DOCUMENTS

| | | | |
|---|---|---|---|
| 2,782,897 A | | 2/1957 | Filander |
| 4,073,372 A | * | 2/1978 | List .................. B65B 43/50 141/169 |

(Continued)

FOREIGN PATENT DOCUMENTS

| | | |
|---|---|---|
| DE | 11 28 774 | 4/1962 |
| DE | 25 58 886 | 7/1977 |

(Continued)

*Primary Examiner* — Mark A Deuble
(74) *Attorney, Agent, or Firm* — Occhiuti & Rohlicek LLP

(57) ABSTRACT

A container-processing machine includes a transfer star having container-engagement elements disposed along a periphery thereof. The transfer star moves containers past first or second sets of processing stations that are disposed along corresponding diametrically opposed arcuate processing paths.

29 Claims, 3 Drawing Sheets

(56) References Cited

U.S. PATENT DOCUMENTS

| | | | | |
|---|---|---|---|---|
| 4,094,411 | A | * | 6/1978 | Kronseder ............. B65G 29/00 |
| | | | | 209/522 |
| 4,266,653 | A | | 5/1981 | Mergl |
| 4,277,928 | A | * | 7/1981 | Ahlers ..................... B67B 3/06 |
| | | | | 53/64 |
| 5,082,105 | A | * | 1/1992 | Tincati ................. B65G 47/846 |
| | | | | 198/473.1 |
| 5,582,285 | A | * | 12/1996 | Kronseder ........... B65G 47/846 |
| | | | | 198/473.1 |
| 6,398,006 | B1 | * | 6/2002 | Dault ........................ B65C 9/04 |
| | | | | 198/377.01 |
| 2003/0106779 | A1 | * | 6/2003 | Stocchi ................. B65G 29/00 |
| | | | | 198/803.3 |
| 2012/0175224 | A1 | * | 7/2012 | Briggs ................. B65G 47/846 |
| | | | | 198/478.1 |
| 2016/0039617 | A1 | * | 2/2016 | Clusserath ............ B65G 29/00 |
| | | | | 198/474.1 |

FOREIGN PATENT DOCUMENTS

| | | |
|---|---|---|
| DE | 195 13 103 | 10/1996 |
| DE | 10 2008 018 516 | 10/2009 |
| FR | 1 042 556 | 11/1953 |

\* cited by examiner

CONTAINER-PROCESSING MACHINE FOR PROCESSING CONTAINERS

RELATED APPLICATIONS

This application is the national stage under 35 USC 371 of PCT/EP2015/050744, filed Jan. 16, 2015, which claims the benefit of the Jan. 17, 2014 priority date of German application DE 102014100496.5, the contents of which are herein incorporated by reference.

FIELD OF INVENTION

The invention relates to a container-processing machine, and in particular, to machines that select processing different types of containers.

BACKGROUND

Known container-processing machines are usually formed at the circumference of a transport element circulating about a vertical axis of rotation. A container inlet conducts the container to the transport element. Usually, a conveyor performs this function. Processed containers are taken from the transport element at a container outlet.

It is not unknown for a processing station to take a container from at transport element. The processing stations can be stationary, or moved together with the transport element over a portion of a circular path.

SUMMARY

Among the objects of the invention is that of providing a container-processing machine that is more flexible in its ability to process containers and/or a container-processing machine that permits processing of different types of containers without re-equipping.

As used herein, "container" means cans and bottles, in each case made of metal, glass, and/or plastic, in particular PET bottles and keg. It also includes other packaging means, such as those that are suitable for filling with powdered or granular products, or liquid/fluid or viscous products.

As used herein, expressions such as "essentially" or "approximately" or "approx" refer to deviations from the exact value in each case by ±10%, preferably by ±5%, and/or deviations in the form of changes that are not of significance for the function.

The container-processing machine according to the invention is configured for processing containers. As used here, "processing" is understood to mean, for example, filling of containers with bulk goods or liquid/fluid goods, the pre-processing, e.g. disinfecting, or closing of the container, e.g. with a screw closure, a crown cork, or a seal closure.

The container-processing machine, hereinafter referred t as a "machine," has at least one transport element that comprises container-receiving means and that is driven to rotate about a machine axis.

The transport element is usually configured as a transfer star or wheel that comprises receiving means at its periphery in which the container-receiving means are formed or that form the container-receiving means. The transport element may, however, have any desired geometry.

The containers to be processed, conducted to the transport element via a container inlet, are conveyed by the rotation of the transport element to a plurality of processing stations, which are usually not moved with the transport element. There is nothing to prevent a processing station, e.g. a filling station, from being movable over a part circle together with the transport element, in order thereby to allow for a slower filling at higher cycle frequency or higher rotational speed of the transport element. The processing stations are regularly stationary or formed at other moved processing devices, e.g. in a further processing star element with a plurality of stations. After the processing at the processing stations, the containers are conveyed by means of the rotation of the transport element to a container outlet, from where the containers are conveyed further. The direction of rotation of the transport element can be selected. Accordingly, in a first direction of rotation of the transport element, a first container-processing route having first processing stations is formed between the container inlet and the container outlet, and in a second direction of rotation, running opposite to the first direction of rotation, a second container-processing route having second processing stations is formed between the container inlet and the container outlet, wherein the first processing stations differ from the second processing station. The invention makes it possible, as a function of the direction of rotation of the transport element, for different forms of processing of containers to be carried out. For example, the first processing stations can differ from the second in that different materials are filled and the containers are then closed in correspondingly different ways. Another option is for the first processing stations to be configured for the filling and closing of first containers, e.g. PET bottles, while the second processing stations are configured for the filling of other second containers, e.g. glass bottles or kegs or cans. This has the advantage that, with one machine, and without extensive re-equipping, two different containers or container types can be processed, e.g. pre-processed, filled, and closed.

Preferably, the first processing stations are configured for the processing of first containers, and the second processing stations for the processing of second containers that differ from the first containers. In this way it is possible for two different containers to be filled, and, if appropriate, closed, with the machine, frequently without re-equipping the machine. In some cases, only a replacement of the transport element is necessary.

In an advantageous further embodiment of the invention, the container-receiving means of the transport element have receiving means for the receiving of at least the first and second containers. In this way, the transport element does not need to be re-equipped in order to convey different containers.

Preferably, therefore, the first processing stations have pre-processing, filling, and/or closing stations for the first containers and second processing stations have pre-processing, filling, and/or closing stations for the second containers.

In an advantageous further embodiment of the invention, the first and second processing stations are held in an exchangeable manner in the container-processing machine. In this way, in addition to the high variability of the machine based on the different forms of working in both directions of rotation of the transport element, a more rapid re-equipment of the machine can be achieved, in order, for example, to be able to carry out special processing tasks in small series without major operational interruption.

In this sense, therefore, the first and second processing stations are formed as function modules that are held in a detachable manner at the container-processing machine.

Preferably, the machine has means with which the containers, during processing at the first and/or second processing stations, can be brought out of engagement with the transport element. This allows for processing operations to be carried out which require a longer time than would be possible due to the cyclic movement or rotational speed of the transport element.

Preferably, at least one processing station has a container carrier, actuated by a lifting device, which, for the raising and lowering of the container, can be moved in a controlled manner between a lower position and an upper position, wherein, for example, for a suspended retaining of the respective container, the container carrier comprises a container neck ring and/or a standing surface for a container base. In this way, different containers can be processed in a simple manner.

Preferably, the transport element is formed as a transport or transfer star element, which comprises at its circumference a plurality of pocket-type container-receiving means, open on the circumference side, which are provided at the same angular distance from one another, related to the axis of rotation.

Preferably, with the machine the container inlet and container outlet are formed from segments of a transport band, preferably from segments of a common transport band conducted through beneath the transport element, wherein preferably the perpendicular middle plane of the common transport band conducted through beneath the transport element encloses machine axis.

Preferably, the first and second processing stations are formed as PET bottle fillers, keg fillers, glass bottle fillers, or can fillers. Preferably, at least one part of the first and second processing stations can be formed as screw closers, crown cork fitters, or sealing stations. With such processing stations, a large range of different containers can be processed in one machine without re-equipping. Accordingly, for example, in a first direction of rotation of the transport element, glass bottles and PET bottles can be processed, while in the second direction of rotation cans and kegs can be filled. On the first container-processing route, therefore, there are arranged all the filling and closing stations for glass and PET bottles, while on the second container-processing route are arranged all the filling and closing stations for cans and kegs. For technical control reasons the number of processing stations should tend to be the same on both container-processing routes, but may also be different.

The throughput of containers can be increased in one arrangement for the processing of containers, which has at least two container-processing machines of the type described heretofore arranged in parallel on a conveying route. In this case, switch points are provided in the conveying route upstream and downstream of the container-processing machines, in order to distribute the container streams onto the machines.

The invention likewise relates to a method for the processing of containers, for example for the filling of containers with a filling material. In this situation, the containers that are to be processed are conveyed by a transport element comprising container-receiving means, which is driven to rotate about a preferably vertical axis of rotation, to processing stations which are preferably not moved with the transport element. The direction of rotation of the transport element can be selected. Accordingly, in a first direction of rotation of the transport element, a first container-processing route having first processing stations is formed between the container inlet and the container outlet, and in a second direction of rotation, running opposite to the first direction of rotation, a second container-processing route having second processing stations is formed between the container inlet and the container outlet. The first processing stations differ from the second processing stations, as a result of which, by controlling the direction of rotation of the transport element, it can be controlled as to how the containers are processed, or whether first or second containers are processed.

Further embodiments, advantages, and possible applications of the invention are also derived from the following description of exemplary embodiments and from the figures. In this situation, all the features described and/or represented as images are in principle the object of the invention, alone or in any desired combination, regardless of their integration in the claims or reference made to them. The contents of the claims are also constituent parts of the description.

BRIEF DESCRIPTION OF THE DRAWINGS

The invention is explained in greater detail hereinafter on the basis of the figures and an exemplary embodiment.

DETAILED DESCRIPTION

Figure 1:
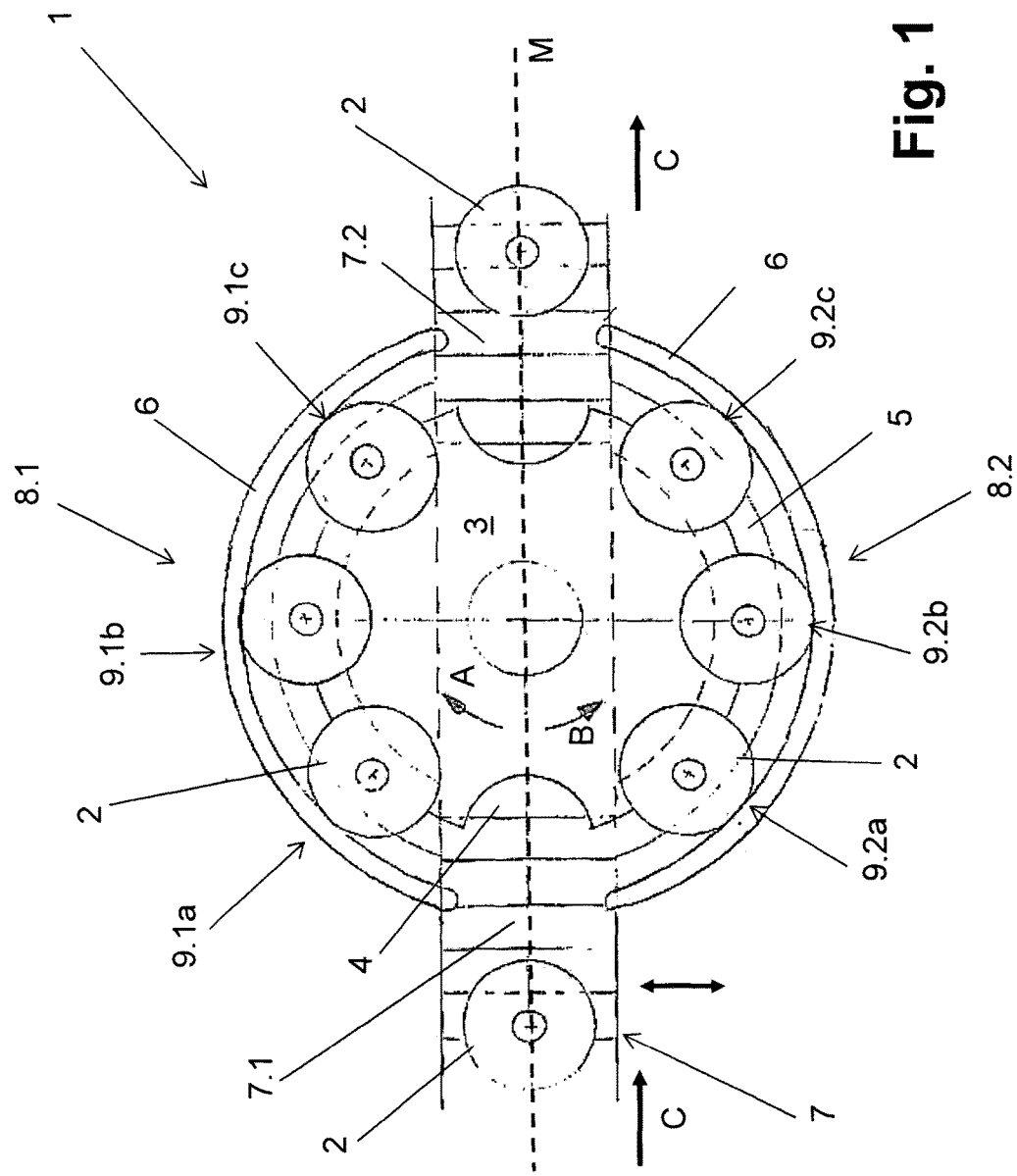
FIG. 1 shows a container-processing machine in the form of a filling machine for filling liquid filling material into either bottles or cans and kegs.

FIG. 1 shows a container-processing machine 1 for filling containers 2, such as cans or bottles. The container-processing machine 1 includes a transfer star 3 that defines a transport plane. The transfer star 3 rotates in steps about a machine axis MA, best seen in FIG. 2. The transfer star 3 can switch between a clockwise rotation A and a counter-clockwise rotation B.

The particular container-processing machine 1 shown is a filling machine for filling containers 2. In the embodiment shown in FIG. 2, the containers 2 are bottles. In the embodiment shown in FIG. 3, the containers 2 are cans. However, the apparatus described herein is not restricted to a particular type of processing.

Around a periphery of the transfer star 3 are pockets 4 separated from each other by a pocket-separation angle. These pockets 4 open in a radially outward direction. The illustrated embodiment has eight such pockets 4. However, different embodiments can have different numbers of pockets.

In addition to a transfer star 3, the container-processing machine 1 has a circular sliding-strip 5 and laterally-disposed arcuate container guides 6. The sliding-strip 5 defines a circle that is centered at the machine axis MA. The container guides 6 follow the sliding strip 5.

In operation, containers slide along the sliding strip 5 on their container bases 2.1 while the guides 6 prevent the containers 2 from falling off the sliding strip 5.

A transport band 7 extends under the transfer star 3. One segment of the transport band 7 acts as a container inlet 7.1. Another segment acts as a container outlet 7.2. In those embodiments in which the container-processing machine 1 is a filling machine, empty containers 2 enter at the container inlet 7.1 while moving in a transport direction C. These containers undergo a detour for processing as described below. After having been processed, they then exit at the container outlet 7.2 while moving again in the transport direction C.

A middle plane M passes through the machine axis MA and bisects the transport band 7, thus defining an axis of symmetry for the container-processing machine 1. The middle plane M is perpendicular to the transport plane defined by the transfer star 3.

A first processing route 8.1 extends between the container inlet 7.1 and the container outlet 7.2 on a first side of the middle plane M. A second processing route 8.2 extends between the container inlet 7.1 and the container outlet 7.2 on a second side of the middle plane M. Both the first and second processing routes 8.1, 8.2 are arcuate processing routes.

Along the first processing route 8.1 are first processing stations 9.1a, 9.1b, 9.1c that are configured for filling and closing bottles. Similarly, along the second processing route 8.2 are second processing stations 9.2a, 9.2b, 9.2c. These second processing stations 9.2a, 9.2b, 9.2c are configured for filling and closing cans and kegs.

If the transfer star 3 receives bottles, it rotates clockwise and sends the bottles to the first processing stations 9.1a, 9.1b, 9.1c. Conversely, if the transfer star 3 receives cans or kegs, it rotates counter-clockwise and sends them to the second processing stations 9.2a, 9.2b, 9.2c.

Figure 2:
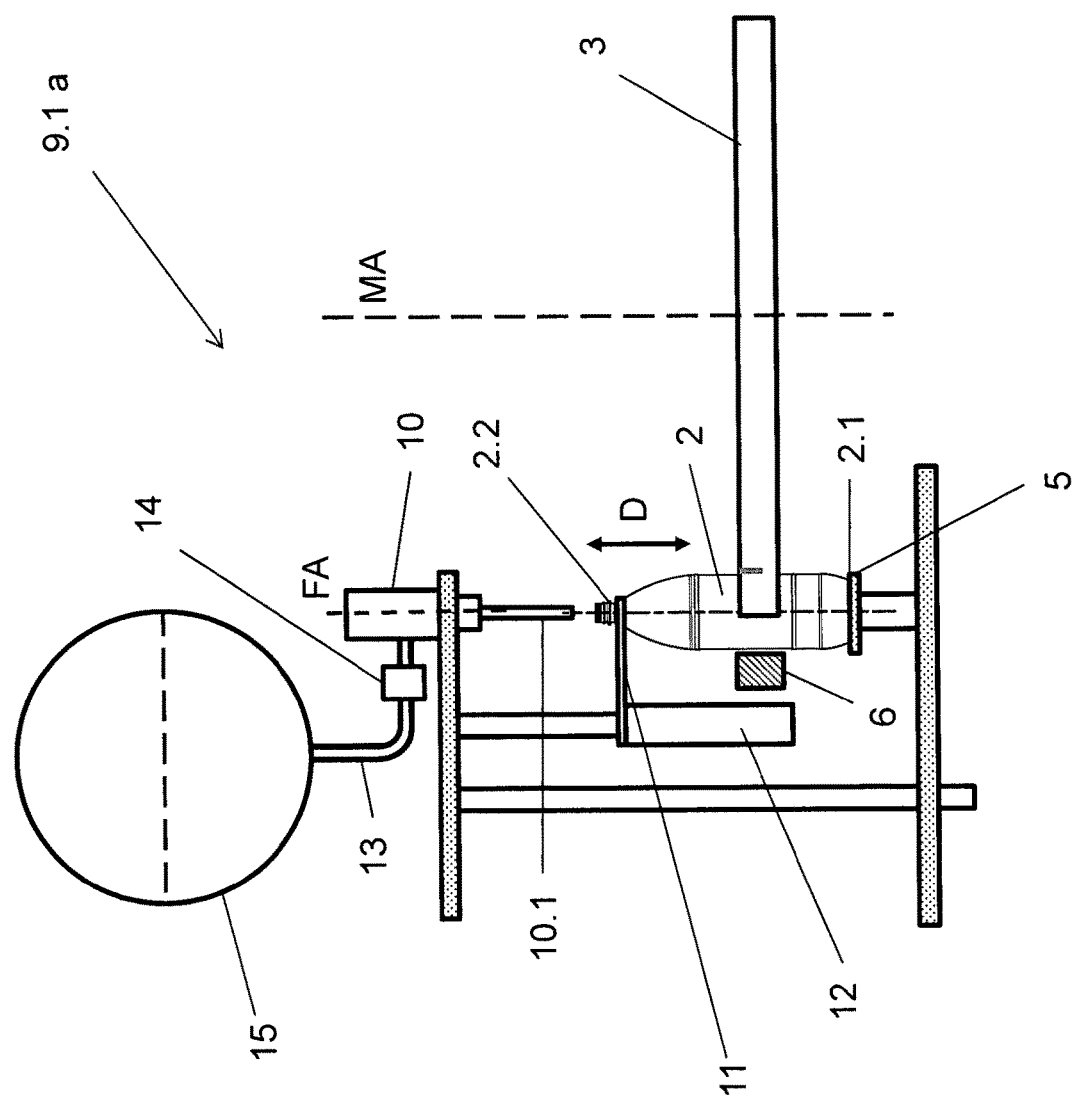
FIG. 2 is a side view of a filling station of FIG. 1 configured to fill bottles.

FIG. 2 shows a typical first processing station 9.1a, which in this case is a filling station for filling bottles 2 with liquid filling-material.

The illustrated first processing station 9.1a includes a filling element 10, a container carrier 11, and a lift 12. The filling element 10 includes a filling tube 10.1 that extends along a vertical filling element axis FA.

In operation, the container carrier 11 suspends a bottle 2 from the bottle's neck ring 2.2. The lift 12, which is coupled to the container carrier 11, causes the container carrier 11 to raise or lower the suspended bottle 2 along a lifting direction D that is parallel to the filling axis FA and to the machine axis MA.

The bottle 2 begins in a lower position. A bottle 2 that is in this lower position stands on its base 2.1 on the sliding strip 5 while being nestled within a pocket 4 that engages a portion of the bottle's circumference. In this lower position, the bottle's opening is at some distance from the bottom of a lower end of the filling tube 10.1.

The lift 12 actuates the container carrier 11, thus causing the container carrier 11 to lift the bottle 2 into an upper lifting position. In its upper lifting position, the bottle 2 has risen completely out of the pocket 4 and above the transfer star 3. In this position, the filling tube 10.1 extends into the neck of the bottle 2.

The filling tube 10.1 connects to a product line 13, which passes through a flowmeter 14, and ultimately, to a filling-material tank 15 that serves both the first and second processing stations 9.1a, 9.1b, 9.1c, 9.2a, 9.2b, 9.2c. Liquid filling-product then passes into the bottle 2 through this product line 13 and out the filling tube 10.1.

In some embodiments, there are two filling stations and two closing stations along the first processing route 8.1. In this case, the transfer star 3 would have eight pockets 4 for the filling and closing stations together.

The following discussion will refer to angles between two points, and in particular, angles between intersections of filling element axes FA and the transport plane. A third point is, of course, required to define an angle. In the discussion that follows, that third point is always the intersection of the machine axis MA and the transport plane.

It also possible for the three processing stations on each of the first and second processing routes 8.1, 8.2 to all be filling stations. The first and second processing stations 9.1a, 9.1b, 9.1c, 9.2a, 9.2b, 9.2c are in this case arranged on the first and second processing routes 8.1, 8.2 in such a way that an angle between filling element axes FA corresponds to that between adjacent pockets 4.

At any time, there will be a first filling element axis FA that is adjacent to the container inlet 7.1 and a second filling element axis FA that is adjacent to the container outlet 7.2. An angle between the middle plane M and the first filling element axis FA is equal to a first value. An angle between the middle plane M and the second filling element axis FA is equal to a second value. The first and second values each correspond to an angle between adjacent pockets 4.

Figure 3:
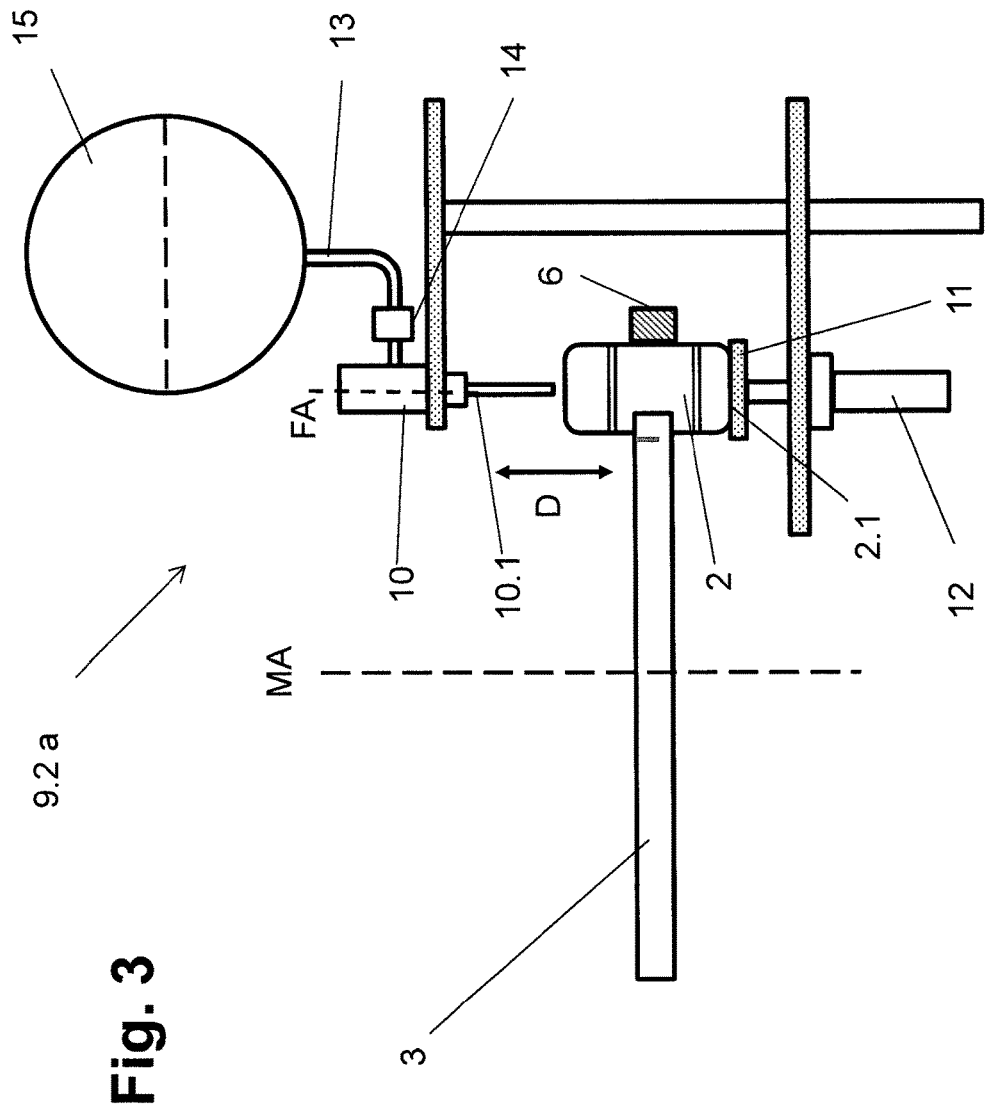
FIG. 3 is a side view of a filling station of FIG. 1 configured to fill cans and kegs.

FIG. 3 shows a typical second processing station 9.2a configured as a filling station. In this embodiment, the sliding strip 5 forms a container carrier 11 in the region of the processing station 9a. This container carrier 11 includes a circular segment on which cans 2 stand upright on their bases 2.1. A lift 12 raises and lowers cans 2 along a lifting direction D between an upper and lower lifting position.

In the lower lifting position, the can 2 is nestled in a pocket 4 at a distance beneath the filling tube 10.1. In the upper lifting position, the can 2 has been raised high enough to be sealed against the filling element 10 and to be above the pocket 4.

In an alternative embodiment, the can 2 moves downwards instead of upward and engages a second processing station 9b arranged beneath the transport plane. The transfer star 3 would then be freely rotatable above the lowered can 2.

The transfer star's diameter is dimensioned in such a way that it serves the first and second processing stations 9.1a, 9.1b, 9.1c, 9.2a, 9.2b, 9.2c. This permits the pockets 4 to receive the cans 2b without the lift's lifting rod colliding with the transfer star 3 even when the container carrier 5a is in its upper lift position.

This embodiment represented in FIG. 3 is also particularly well-suited for the filling of cans 2b in form of what are referred to as party cans.

With the container-processing machine 1 according to the invention, in accordance with FIGS. 1 to 3, it is therefore possible, simply by changing the direction of rotation of the transfer star 3 to choose between filling containers of a first type and containers of a second type. This can be done without having to stop or re-equip the machine.

The containers of a first type include bottles, such as glass and PET bottles. The containers of the second type include cans, kegs, party cans, and casks. The bottles that can be filled include both glass and PET bottles.

An advantageous feature of the apparatus as described herein is that one can fill containers 2 of different types by simply controlling rotation of the transfer star 3. In addition, the processing stations can be adapted such that the first processing stations will carry out a first kind of treatment of a first type of container and the second processing stations will carry out a second type of treatment also on the first type of container. Selection between these two treatment types can be achieved by simply changing the transfer star's direction of rotation.

The apparatus achieves the foregoing functions using a simple, compact, and economical rotation structure with reduced spatial requirements and that permits rapid change-over between containers of different types.

In addition, the first and second processing stations 9.1a, 9.1b, 9.1c, 9.2a, 9.2b, 9.2c do not move with the transfer star. Instead, they are stationary with respect to an inertial reference frame associated with the machine's frame. Therefore, there is no need for complex machinery to transfer media, energy, and signals between the machine frame and a moving rotor, or to processing stations on the moving rotor. As a result, it is possible to dispense altogether with a variety of complex structures such a ball rotation connection between rotor and machine frame, a media rotary distributor for filling material and sterile gaseous and/or vaporous media, a media rotary distributor for pneumatic fluids, for the actuation filling elements and/or control valves, slip rings and slip ring distributors for electrical energy supply and/or electrical instrumentation and control signals, and torque supports A container-processing machine 1 as described herein, when configured as a filling machine, achieves satisfactory filling capacities in practice. For example, with an arrangement of six first and second processing stations 9.1*a*, 9.1*b*, 9.1*c*, 9.2*a*, 9.2*b*, 9.2*c* configured as filling stations on both first and second processing routes 8, 8.2, it is possible to fill beer into 0.5 liter bottles or cans at a rate of up to 3000 bottles or cans per hour can be achieved, all in a compact space occupied mostly by a transfer star 3 having a diameter of only about 800 mm.

The invention has been explained for the particular special case in which the container-processing machine 1 is a filling machine. The basic principles of the invention, however, hardly depend on exactly what the processing stations are actually doing. Thus, the container-processing machine 1 according to the invention can also be configured for other types of container-processing. For example, processing stations could also be closing heads or sterilizing heads.

For those cases in which the container-processing machine 1 has been configured for closing containers 2, there exist two variants of particular interest.

In a first variant, a closure device waits at the container outlet 7.2 for a filled container. With cyclic rotation outwards of the filled containers 2, at the loading/unloading position of the transfer star 3 at the container inlet 7.1, a new empty container is pushed into a free pocket 4 of the transfer star 3. At the same time, at the container outlet 7.2 on the discharge side, a full container 2 is positioned on the transport band 7. This full container 2 is briefly fixed at the container outlet 7.2. While the container 2 is thus briefly fixed, the closure device, which has been waiting there, closes it. Preferably, the closure device is a stamp-in device. The release of the container 2 for transport away does not take place until after the closure. Once the container 2 has been transported away, further rotations of the transfer star 3 can take place.

In a second variant, the first processing stations 9.1*a*, 9.1*b*, 9.1*c* are all filling stations and the second processing stations 9.2*a*, 9.2*b*, 9.2*c* are all closing stations. The transfer star 3 brings the containers 2 along the first processing route 8.1 for filling. After having filled all the containers 2 arranged on the first processing route 8.1, the transfer star 3 rotates to bring them all to the second processing stations 9.2*a*, 9.2*b*, 9.2*c* for closing. The filled containers 2 are transferred entirely by rotation of the transfer star 3 into the second processing route 8.2.

As the transfer star 3 brings the filled containers to the second processing stations 9.2*a*, 9.2*b*, 9.2*c*, it is also brings new empty containers to the first processing stations 9.1*a*, 9.1*b*, 9.1*c*. While the containers 2 are being filled by the first processing stations 9.1*a*, 9.1*b*, 9.1*c*, sufficient time remains for the containers located on the second processing route 8.2 to be closed and then conveyed backwards to the container outlet 7.2. By the time the new containers 2 have been filled, they can then lowered into the pockets 4 since all the closed containers 2 will be then have already left the container-processing machine 1.

An advantage of these variants is that open containers 2, both in the empty and filled states, remain in the same enclosed hygienic region until discharge at the container outlet 7.2 or the transport band 7. Likewise, the containers 2 remain separated from one another. No buffer stretch is required between the fillers and closers. This results in an advantageously short waiting time achieved between the filling and the closing of the containers 2.

Another possibility is that of arranging the processing stations for a pre-treatment of containers 2 that are stored in advance of the filling stations. This allows different containers 2 to be filled and closed in each case with three first processing stations 9.1*a*, 9.1*b*, 9.1*c* and three second processing stations 9.2*a*, 9.2*b*, 9.2*c*.

The invention has been described heretofore by way of embodiments. It is understood that further modifications and divergences are possible, without departing from the basic inventive concept of the invention.

The invention claimed is:

1. An apparatus comprising a first container-processing machine for processing containers, said first container-processing machine comprising a transfer star, container-engagement elements, a container inlet, a container outlet, first processing stations, second processing stations, a first processing route, and a second processing route, wherein said container-engagement elements are disposed along a periphery of said transfer star, wherein said transfer star is driven to rotate about a machine axis in a direction selected from a first direction and a second direction, wherein said transfer star receives containers to be processed at said container inlet, wherein said transfer star discharges containers that have been processed at said container outlet, wherein said first processing stations are disposed along said first processing path, wherein said second processing stations are disposed along said second processing path, wherein selection of said first direction causes containers to traverse said first processing route, wherein selection of said second direction causes containers to traverse said second processing route, wherein said first processing stations differ from said second processing stations, and wherein said first and second processing routes are arcuate processing routes.

2. The apparatus of claim 1, wherein said transfer star rotates relative to a reference frame and said first and second processing stations are stationary relative to said reference frame.

3. The apparatus of claim 1, wherein said first processing stations are configured to process a first type of container and said second processing stations are configured to process a second type of container.

4. The apparatus of claim 3, wherein said first processing stations comprise filling stations configured to fill said first type of container and said second processing stations comprise filling stations configured to fill said second type of container.

5. The apparatus of claim 4, wherein said first processing stations further comprise closing stations configured to close said first type of container and said second processing stations further comprise closing stations configured to close said second type of container.

6. The apparatus of claim 3, wherein said first processing stations comprise closing stations configured to close said first type of container and said second processing stations comprise closing stations configured to close said second type of container.

7. The apparatus of claim 1, wherein said container-engagement elements are configured to receive a first type of container and a second type of container.

8. The apparatus of claim 1, wherein said first and second processing stations are held in said first container-processing machine in an exchangeable manner.

9. The apparatus of claim 1, wherein said first and second processing stations comprise function modules held in said first container-processing machine in an exchangeable manner.

10. The apparatus of claim 1, further comprising a lift that lifts containers out of engagement with said transfer star.

11. The apparatus of claim 10, further comprising a container carrier actuated by said lift, wherein said container carrier raises a container into an upper position and lowers said container into a lower position.

12. The apparatus of claim 11, wherein said container carrier comprises a retainer for suspending a bottle from a neck ring thereof.

13. The apparatus of claim 11, wherein said container carrier comprises a surface for supporting a base of a container.

14. The apparatus of claim 11, wherein said container carrier comprises a gripper for gripping a container.

15. The apparatus of claim 1, wherein said container-engagement elements comprise pockets that are open in a radially outward direction of said transfer star.

16. The apparatus of claim 1, wherein said container-engagement elements comprise grippers.

17. The apparatus of claim 1, wherein pairs of adjacent ones of said container-engagement elements are separated by the same space.

18. The apparatus of claim 1, wherein each of first processing stations comprises a first number of processing stations and said second processing stations comprises said first number of processing stations, and wherein said first number is greater than two.

19. The apparatus of claim 1, further comprising a transport band having a first segment and a second segment, wherein said container inlet comprises said first segment, wherein said container outlet comprises said second segment, wherein said transport band is conducted beneath said transfer star along a path that crosses said machine axis.

20. The apparatus of claim 1, wherein at least one of said first and second processing stations comprises a PET bottle filler.

21. The apparatus of claim 1, wherein at least one of said first and second processing stations comprises a glass bottle filler.

22. The apparatus of claim 1, wherein at least one of said first and second processing stations comprises a keg filler.

23. The apparatus of claim 1, wherein at least one of said first and second processing stations comprises a can filler.

24. The apparatus of claim 1, wherein at least one of said first and second processing stations comprises a screw closer.

25. The apparatus of claim 1, wherein at least one of said first and second processing stations comprises a crown cork fitter.

26. The apparatus of claim 1, wherein at least one of said first and second processing stations comprises a sealing station.

27. The apparatus of claim 1, further comprising a second container-processing machine having the features of said first container-processing machine, said first and second container-processing machines being arranged in parallel in a conveying route.

28. The apparatus of claim 1, wherein said first container-processing machine is a filling machine for filling said containers with liquid filling-material, and wherein said first and second processing stations comprise filling elements.

29. A method of processing containers, said method comprising selecting a selected arc from one of a first and second arc of a circle that surrounds a machine axis, aid first and second arcs being diametrically opposite each other, wherein containers moving along said first arc encounter first processing stations and containers moving along said second arc encounter second processing stations, wherein said first and second processing stations are configured for processing corresponding first and second types of container, and conveying said containers between a container inlet and a container outlet along said selected arc.

* * * * *